United States Patent
Frahim et al.

(10) Patent No.: US 9,917,861 B2
(45) Date of Patent: Mar. 13, 2018

(54) ENABLING ACCESS TO AN ENTERPRISE NETWORK DOMAIN BASED ON A CENTRALIZED TRUST

(71) Applicant: Cisco Technology, Inc., San Jose, CA (US)

(72) Inventors: Jazib Frahim, Cary, NC (US); Klaas Wierenga, Utrecht (NL); Carlos Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 126 days.

(21) Appl. No.: 14/875,967

(22) Filed: Oct. 6, 2015

(65) Prior Publication Data

US 2017/0099321 A1    Apr. 6, 2017

(51) Int. Cl.
*H04L 12/28*    (2006.01)
*H04L 29/06*    (2006.01)

(52) U.S. Cl.
CPC .......... *H04L 63/20* (2013.01); *H04L 63/0876* (2013.01); *H04L 63/104* (2013.01)

(58) Field of Classification Search
CPC .... H04L 63/20; H04L 63/0876; H04L 63/104
See application file for complete search history.

(56) References Cited

U.S. PATENT DOCUMENTS

| 7,926,089 | B2 | 4/2011 | Tulshibagwale et al. |
| 2004/0255167 | A1* | 12/2004 | Knight ................... G06Q 10/10 726/24 |
| 2006/0021017 | A1 | 1/2006 | Hinton et al. |
| 2009/0307744 | A1 | 12/2009 | Nanda et al. |
| 2012/0291090 | A1* | 11/2012 | Srinivasan .......... G06F 21/6236 726/1 |
| 2013/0160105 | A1 | 6/2013 | Huang et al. |

OTHER PUBLICATIONS

"What is eduroam?", eduroam US—Global Wi-Fi roaming for academia, https://www.eduroam.us/introduction, downloaded from the internet on Oct. 6, 2015, 1 page.

* cited by examiner

*Primary Examiner* — Brandon Hoffman
*Assistant Examiner* — Nega Woldemariam
(74) *Attorney, Agent, or Firm* — Edell, Shapiro & Finnan, LLC

(57) ABSTRACT

A method of establishing centralized trust includes, at a policy server having connectivity to a network, establishing a trust relationship with a first enterprise network domain and a second enterprise network domain. One or more criterion from a server in the first enterprise network domain are received by the policy server and a federation relationship is established between at least a portion of the first enterprise network domain and one or more entities in the second enterprise network domain based on the one or more criterion. Based on the federation relationship, the policy server enables the one or more entities in the second enterprise network domain to access the at least a portion of the first enterprise network domain.

20 Claims, 6 Drawing Sheets

ENABLING ACCESS TO AN ENTERPRISE NETWORK DOMAIN BASED ON A CENTRALIZED TRUST

TECHNICAL FIELD

The present disclosure relates to security services and, more specifically to identity and federation management.

BACKGROUND

The Internet of Everything (IoE) is creating many new scenarios where both people and things (i.e., machines or devices) in an enterprise environment are interconnected through the enterprise's information technology (IT) infrastructure to form an enterprise ecosystem (i.e., an enterprise network domain). Moreover, enterprises are now partnering to form partner ecosystems that allow partner vendors to service enterprise devices or provide other support services to the enterprise ecosystem. The number of IT partners supporting or otherwise connected to an enterprise ecosystem can be very large, thereby causing the enterprise ecosystem to become quite complex. Enterprise ecosystems become even more complex when IT partners connect through the cloud. Due to the increased use of cloud infrastructure and the increased number of partnerships, the overall infrastructure complexity is rapidly increasing.

In order to utilize partner ecosystems, enterprises frequently look for identity brokerage services to allow users from partner enterprises to access their resources and infrastructure. Remote Authentication Dial-In User Service (RADIUS), which was designed with an enterprise focus, is one of the most commonly used protocols for authenticating network-based and remote-access users (or even devices) when devices and/or users need authentication services to access resources included in an enterprise network domain. Additionally, in some instances, two enterprises may agree to form a federation relationship that helps broker information from one identity database in a first enterprise network domain to another that is maintained and managed by a different enterprise network domain. In a federation relationship, the partner enterprises are interconnected and configured to operate in a common management framework under a common management authority. The interdependency between different entities in cross-domain relationships further increases the infrastructure complexity.

BRIEF DESCRIPTION OF THE DRAWINGS

Like reference numerals have been used to identify like elements throughout this disclosure.

DESCRIPTION OF EXAMPLE EMBODIMENTS

Overview

Figure 1:
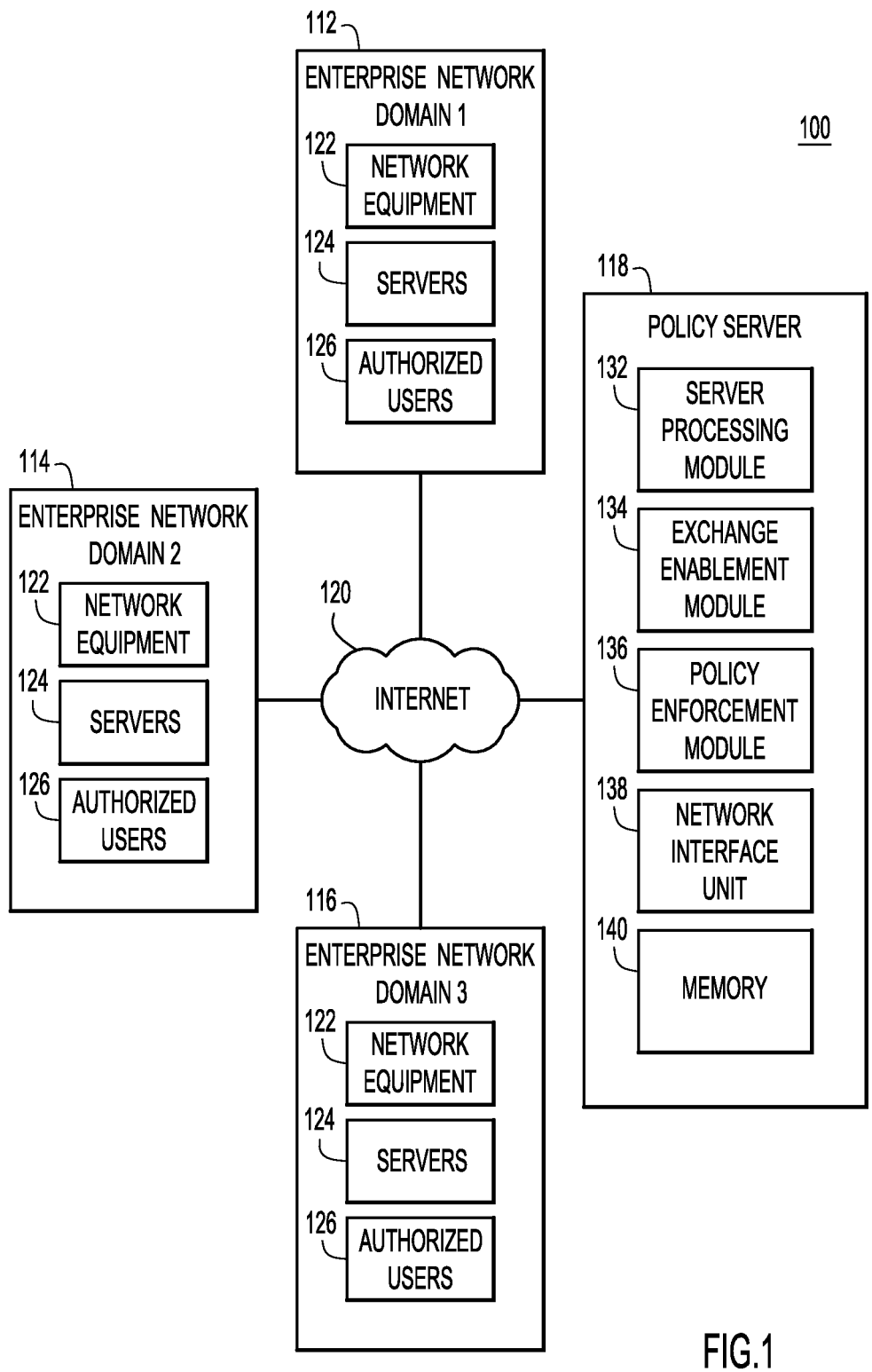
FIG. 1 is a block diagram of a cloud computing environment in which access to an enterprise network domain is enabled based on establishing a centralized trust, according to an example embodiment.

Techniques are provided herein for enabling access to an enterprise network domain based on establishing a centralized trust. These techniques may be embodied as a method, a system, and instructions in a non-transitory computer-readable storage media to perform the method.

According to at least one example embodiment, at a policy server having connectivity to a network, a trust relationship is established with a first enterprise network domain and a second enterprise network domain. The policy server receives one or more criterion from a server in the first enterprise network domain and establishes a federation relationship between at least a portion of the first enterprise network domain and one or more entities in the second enterprise network domain based on the one or more criterion. Based on the federation relationship, the policy server enables the one or more entities in the second enterprise network domain to access the at least a portion of the first enterprise network domain.

Example Embodiments

Presented herein are systems and methods to enable access to an enterprise network domain based on establishing a centralized trust. More specifically, techniques presented herein enable a cloud-based server to facilitate an exchange of access or information, including identity information, between multiple enterprise network domains. The cloud-based server (i.e., a policy server) establishes trust relationships with a number of enterprise network domains and, based on information received from the enterprise network domains, establishes federation relationships between the trusted enterprise network domains. In other words, the cloud-based server may act as a "central hub" for identity management and federation through which enterprise network domains can connect to partner enterprise network domains. The cloud-based server controls these connections by enforcing the policies of the enterprise network domains that are connected to the server.

By establishing a trust relationship between a "central hub" and enterprise network domains (i.e., authenticating the identity of each enterprise network domain) prior to allowing any two enterprise domains to enter into or form a trusted relationship, the techniques provided herein enable authentication or identification processes to be separated from federation or partnership processes. Consequently, a much more flexible and scalable form of federations can be created. For example, instead of managing (i.e. developing and enforcing) peering or partnership policies for every partner, an enterprise can manage and enforce a single set of policies that can be scaled to any number of partners via the central hub (i.e., policy server), thereby reducing the required number of managed policies from a multiple of the number of partners (i.e., N partners×M policies) to a sum of the number of partners and the number of policies (i.e., N partners+M policies). Moreover, semantic trust separation makes it natural and easy to establish ad-hoc or permanent sub-federations (subsets of entities within the federation) and recursive federations which may further reduce the number of policies that an enterprise needs to manage to control the access provided to partner enterprises. Still further, by moving the policy enforcement to the cloud, administrators can benefit from predefined federations and sub-federations and implementing a network roaming policy can be as simple as clicking a checkbox.

Reference is first made to FIG. 1, which illustrates a cloud computing environment 100 that includes a first enterprise network domain 112, a second enterprise network domain 114, and a third enterprise network domain 116 that are connected to each other and to a policy server 118 via a network, e.g., the Internet 120. Each of the first enterprise network domain 112, second enterprise network domain 114, and the third enterprise network domain 116 includes network equipment 122 (e.g., network switches, routers, etc.) to enable network connectivity within the respective enterprise network domain and to the Internet 120. Additionally, each of the first enterprise network domain 112, second enterprise network domain 114, and the third enterprise network domain 116 includes at least one server 124, such as a RADIUS server, that collectively services computing needs of the enterprise and a group of authorized users 126 that are authorized to access the servers 124 and network equipment 122 within their respective enterprise network domain 112, 114, or 116. As an example, each of the first enterprise network domain 112, second enterprise network domain 114, and the third enterprise network domain 116 may include a RADIUS server to manage and authenticate the identities of the authorized users 126 for its respective enterprise network domain. Put another way, each enterprise network domain, at least for the purposes of the examples presented herein, includes any resources (i.e., applications, equipment, information, etc.) maintained by the enterprise, as well as any users who are authorized to access these resources (i.e., employees).

The policy server 118 includes various modules that interact with the enterprise network domains 112, 114, and 116, in order to process data provided by the enterprise network domains 112, 114, and 116, and form relationships between the enterprise network domains 112, 114, 116, or at least portions thereof. More specifically, policy server 118 includes a server processing module 132 that can interact with any servers 124 included in the enterprise network domains 112, 114, and 116 and an exchange enablement module 134 that can authorize or enable an exchange of access or information between the first enterprise network domain 112, the second enterprise network domain 114, and the third enterprise network domain 116, or at least portions thereof. The policy server 118 also includes a policy enforcement module 136 that can analyze and enforce any policies or criterion received from the first enterprise network domain 112, the second enterprise network domain 114, and the third enterprise network domain 116. Additionally, policy server 118 includes a memory 140 and a network interface unit 138 to enable network connectivity, such as to the Internet 120.

Generally, memory 140 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 140 may be or include one or more tangible (non-transitory) computer readable storage media (e.g., a memory device) encoded with software comprising computer executable instructions. For example, memory 140 may store instructions that may be executed by the server processing module 132, the exchange enablement module 134, and/or the policy enforcement module 138 for performing tasks associated with establishing a centralized trust and/or enabling access to an enterprise network domain based on the centralized trust, as described below with reference to FIGS. 2-6.

Figure 2:
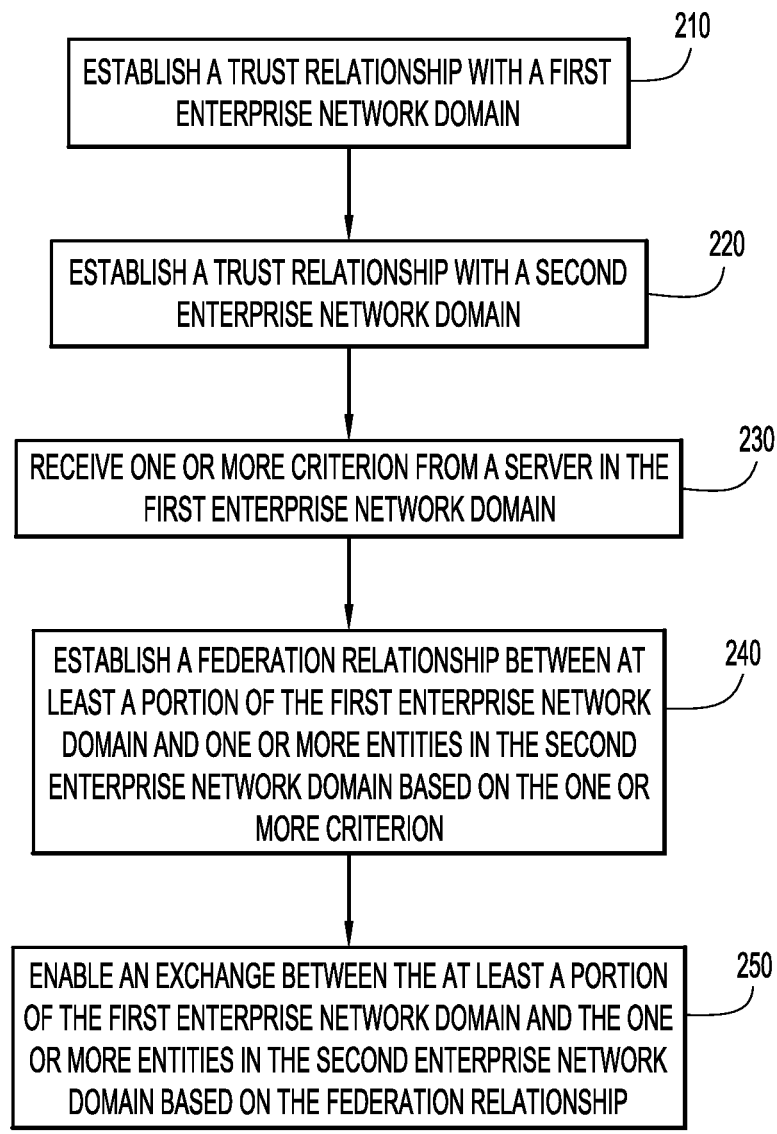
FIG. 2 is a high-level flowchart depicting operations performed by a policy server to enable access to an enterprise network domain based on a centralized trust, according to an example embodiment.

Now referring to FIG. 2, high-level flowchart 200 depicts operations performed by the policy server 118 to enable access to an enterprise network domain based on establishing a centralized trust, according to an example embodiment. Reference is also made to FIG. 1 for purposes of the description of FIG. 2. Initially, at step 210, the policy server 118 establishes a trust relationship with a first enterprise network domain 112. In other words, the policy server 118 establishes a technical trust with the first enterprise network domain 112. However, at step 210 only the validity of the endpoints is established (i.e., "am I talking to the host I think I should be talking to") and business relationships between multiple enterprise network domains are not recognized or established.

In some embodiments, the policy server 118 automatically establishes a trust relationship with a first enterprise network domain 112 by exchanging metadata with a server included in the first enterprise network domain 112. For example, the policy server 118 and one of the servers 124 in the first enterprise network domain 112 may exchange metadata including domain names, Internet Protocol (IP) addresses of the various servers 124 included in the first enterprise network domain 112 (i.e., RADIUS servers), shared keys, X.509 certificates, protocol endpoint information, and/or other such information. In some embodiments, the policy server 118 establishes the trust relationship with a RADIUS server included in the servers 124 of the first enterprise network domain 112 because the RADIUS server may be able to authenticate the identity of the first enterprise network domain 112.

However, in other embodiments, the first enterprise network domain 112 may establish or authenticate its identity with the policy server 118 in any manner. For example, in some embodiments, an administrator from the first enterprise network domain 112 may enroll the first enterprise network domain 112 with the policy server 118. In these instances, once an enterprise decides to take part in a network roaming ecosystem, the enterprise may sign a policy agreement and then the first enterprise network domain 112 and policy server 118 can be configured to mutually trust each other. Regardless of how the first enterprise network domain 112 is authenticated, a successful authentication allows the policy server 118 to establish a trust relationship with the first enterprise network domain 112. Moreover, once a first enterprise network domain 112 establishes a trust relationship with the policy server 118, the first enterprise network domain 112 may not need to establish another trust relationship. Instead, the first enterprise network domain 112 may form a single trust relationship with the policy server 118 and the policy server 118 may establish any further trust or federation relationships.

Once a trust relationship is established at step 210, the first enterprise network domain 112 is considered a part of an identification federation service provided by the policy server 118. However, the first enterprise network domain 112 cannot send or process any requests through or from the policy server 118, respectively, to establish a federation relationship until the policy server 118 establishes a trust relationship with another participating enterprise. Consequently, at step 220, a trust relationship is established with a second enterprise network domain, e.g., enterprise network domain 114. A trust relationship can be established with the second enterprise network domain 114 in the same manner that a trust relationship is established with the first enterprise network domain 112 at step 210. In other words, the policy server 118 can establish a trust relationship with the second enterprise network domain 114 by automatically exchanging metadata with a server 224 in the second enterprise domain 114, by enrolling the second enterprise network domain 114 and configuring the second enterprise network domain 114 and policy server 118 accordingly, or any other manner. Since the technical trust establishment performed at steps 210 and 220 involves authenticating endpoints, and does not involve business relationships between enterprises, in some embodiments the trust establishment (i.e., enrollment) can easily be subcontracted and automated. For example in a managed services offering with an on-premises portion, the necessary technical trust may be part of the already created trust relation between the on-premises portion and the enterprise's cloud infrastructure.

At step 230, the policy server 118 receives one or more criterion from a server 124 in the first enterprise network domain 112. In other embodiments, the policy server 118 may receive one or more criterion from any enterprise network domain that the policy server 118 has established a trust relationship with; however, for simplicity, the first enterprise network domain 112 is shown and described as providing the one or more criterion since the policy server 118 is establishing a federation relationship for the first enterprise network domain 112. In some embodiments, the one or more criterion may include a list of enterprise network domains that the first enterprise network domain 112 considers trusted. However, in other embodiments, the one or more criterion may be or include policies, rules, etc. that enable the policy server 118, via the policy enforcement module 136, to determine whether the first enterprise network 112 desires to enter into a federation relationship with another enterprise network domain or a portion thereof (i.e., certain entities included in the second enterprise network domain 114). As is described below with regards to FIGS. 3-6, in different embodiments, the one or more criterion may have any degree of granularity. Consequently, some criteria may define specific entities or portions of another enterprise network domain (i.e., specific servers of servers 124 or groups of the authorized users 126 from the second enterprise network domain 114 or third enterprise network domain 116) as entities that may be given access to the first enterprise network domain 112, or portions thereof, while other criteria may define enterprise network domains that may be given access to the first enterprise network domain 112, or portions thereof.

In some embodiments, the policy server 118 may provide a portal (i.e., website) with a graphical user interface to allow an administrator associated with the first network enterprise 112 to provide the one or more criterion. In these embodiments, the administrator in the first enterprise network domain 112 may connect to a portal from any device in the first enterprise network domain 112 (since these devices are authorized at step 210). From the portal, the administrator may modify any criterion or policies associated with the first enterprise network domain 112, such as join and/or disjoin policies.

At step 240, a federation relationship is established between at least a portion of the first enterprise network domain 112 and one or more entities in the second enterprise network domain 114 based on the one or more criterion received at step 230. In some embodiments, the policy server 118 may establish a federation relationship between two enterprise network domains selected from a list of enterprise network domains that have already established a trust relationship with the policy server 118 (i.e., enterprise network domains that have already registered or enrolled in the federation service) based on the one or more criterion received at step 230. Additionally or alternatively, the policy server 118 may send or accept requests to form a federation relationship based on the criteria received at step 230. In these instances, the criteria may define requests that should be made to other enterprise network domains and/or which requests should be accepted from other enterprise network domains enrolled with the federation system.

In some embodiments, the policy server 118 may automatically generate a request to establish a federation relationship. Additionally or alternatively, the policy server 118 may allow an administrator to search for other enterprises with which the first enterprise network domain 112 desires to establish a federation relationship. For example, the policy server 118 may enable an administrator from the first enterprise network domain 112 to search for a second enterprise network domain 114 that has already established a trust relationship with the policy server 118 (i.e., it is part of the federation service) and send a request to establish a federation. Regardless of how the request is generated, a request may contain the following information: a destination domain (i.e., xyz.com), a destination server (i.e., id.xyz.com), whether trust should be enabled (i.e., Yes or No), a source domain (i.e., abc.com), and a source domain server (i.e., id.abc.com). In other words, a request may identify the sender (the source) and the receiver (the destination) of the request. As another example, a first enterprise network domain may submit a request to join a roaming consortium with at least some of the same information.

In some embodiments, the second enterprise network domain 114 may be required to approve a request from the first enterprise network domain 112, either explicitly or by indicating an intention to accept via one or more criterion submitted to the policy server 118. For example, in some embodiments, upon approving a request for access, the administrator of the second enterprise network domain 114 can select a certain server to provide access to and enforce security controls (i.e. an identity (ID) server with virtual local area network (VLAN) security), such that authorized users 124 from the first enterprise network domain 112 are only provided with access to the ID server with the applied security controls. More specifically, the administrator of the second enterprise network domain 114 may input at least the following information when accepting (or denying) a request: destination domain (i.e., abc.com), domain destination server (i.e., id.abc.com), whether trust should be enabled (Yes or No), and policy profile (i.e., VLAN 10).

Once a federation relationship is established between at least a portion of the first enterprise network domain 112 and one or more entities of the second enterprise network domain 114, the exchange enablement module 134 of the policy server 118 enables an exchange of access or information therebetween at step 250. As is discussed in further detail below, in some embodiments, the relationship may enable authorized users 126 from the second enterprise network domain 114 to access to the network equipment 122 from the first enterprise network domain 112, such that the authorized users 126 from the second enterprise network domain 114 can access the Internet 120 while on the premises of the first enterprise. However, in other embodiments, the relationship may enable authorized users 124 from the second enterprise network domain 114 to access to some or all of the servers 124 included in the first enterprise network domain 112. The amount of access provided to the enterprise network domains, or portions thereof, in a federated relationship may be controlled by the exchange enablement module 134 of policy server 118 based on analysis performed by the policy enforcement module 138 on the one or more criterion received from these enterprise network domains.

Figure 3:
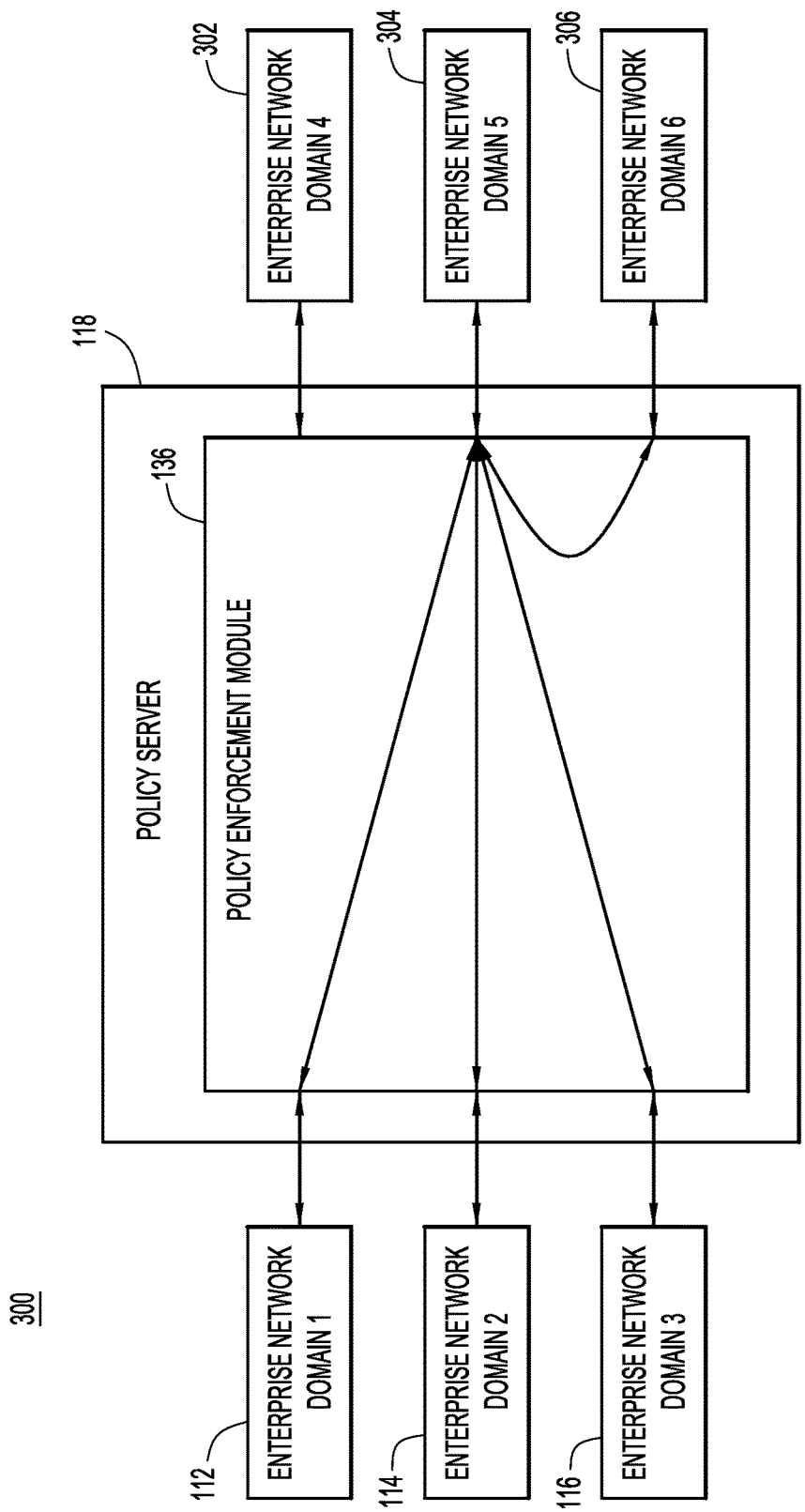
FIGS. 3, 4, 5, and 6 are block diagrams illustrating partner ecosystems established by a policy server, according to example embodiments.

Now referring to FIG. 3, an example partner ecosystem 300 is illustrated. Reference is also made to FIG. 1 for purposes of the description of FIG. 3. In example partner ecosystem 300, the policy server 118 has established trust relationships with six different enterprise network domains:

the first enterprise network domain 112, the second enterprise network domain 114, the third enterprise network domain 116, a fourth enterprise network domain 302, a fifth enterprise network domain 304, and a sixth enterprise network domain 306. As mentioned above, the policy server 118 may receive one or more criterion from each of these enterprise network domains and, based on the one or more criterion, the policy server 118, via policy enforcement module 136, may establish federation relationships between any of these enterprise network domains.

In the example embodiment depicted in FIG. 3, the policy server 118 has received criteria from the fifth enterprise network domain 304 indicating that the first enterprise network domain 112, the second enterprise network domain 114, the third enterprise network domain 116, and the sixth enterprise network domain 306 are trusted partners of the fifth enterprise network domain 304. Additionally, the policy server 118 has received criteria from the first enterprise network domain 112, the second enterprise network domain 114, the third enterprise network domain 116, and the sixth enterprise network domain 306 indicating that the fifth enterprise network domain 304 is a trusted partner. Thus, a federation relationship has been formed between the fifth enterprise network domain 304 and each of these enterprise network domains. For example, the fifth enterprise network domain 304 may have a business relationship with the first enterprise network domain 112, the second enterprise network domain 114, the third enterprise network domain 116, and the sixth enterprise network domain 306 and may have provided an indication of this relationship to the policy server. By comparison, the fifth enterprise network domain 304 may not have a business relationship with the fourth enterprise network domain 302 and, thus, a federation relationship has not been formed with the fourth enterprise network domain 302.

Due to the established federation relationships, users associated with the first enterprise network domain 112, the second enterprise network domain 114, third enterprise network domain 116, and the sixth enterprise network domain 306 can access at least a portion of the resources of the fifth enterprise network domain 304. Similarly, the federation relationship may allow the users associated with the fifth enterprise network domain 304 to access at least a portion of the resources (i.e., a cloud-based security service) of the first enterprise network domain 112, at least a portion of the resources of the second enterprise network domain 114 (i.e., resources relating to a partnership project), at least a portion of the resources of the third enterprise network domain 116 (i.e., an identify management server), and at least a portion of the resources of the sixth enterprise network domain 306 (i.e., a file sharing server). In other words, the fifth enterprise network domain 304 may leverage services or resources from its partners after the policy server 118 establishes a federation relationship therebetween. Similarly, the partner enterprise network domains may access the portions of the fifth enterprise network domain 304 required to provide their respective service.

Figure 4:
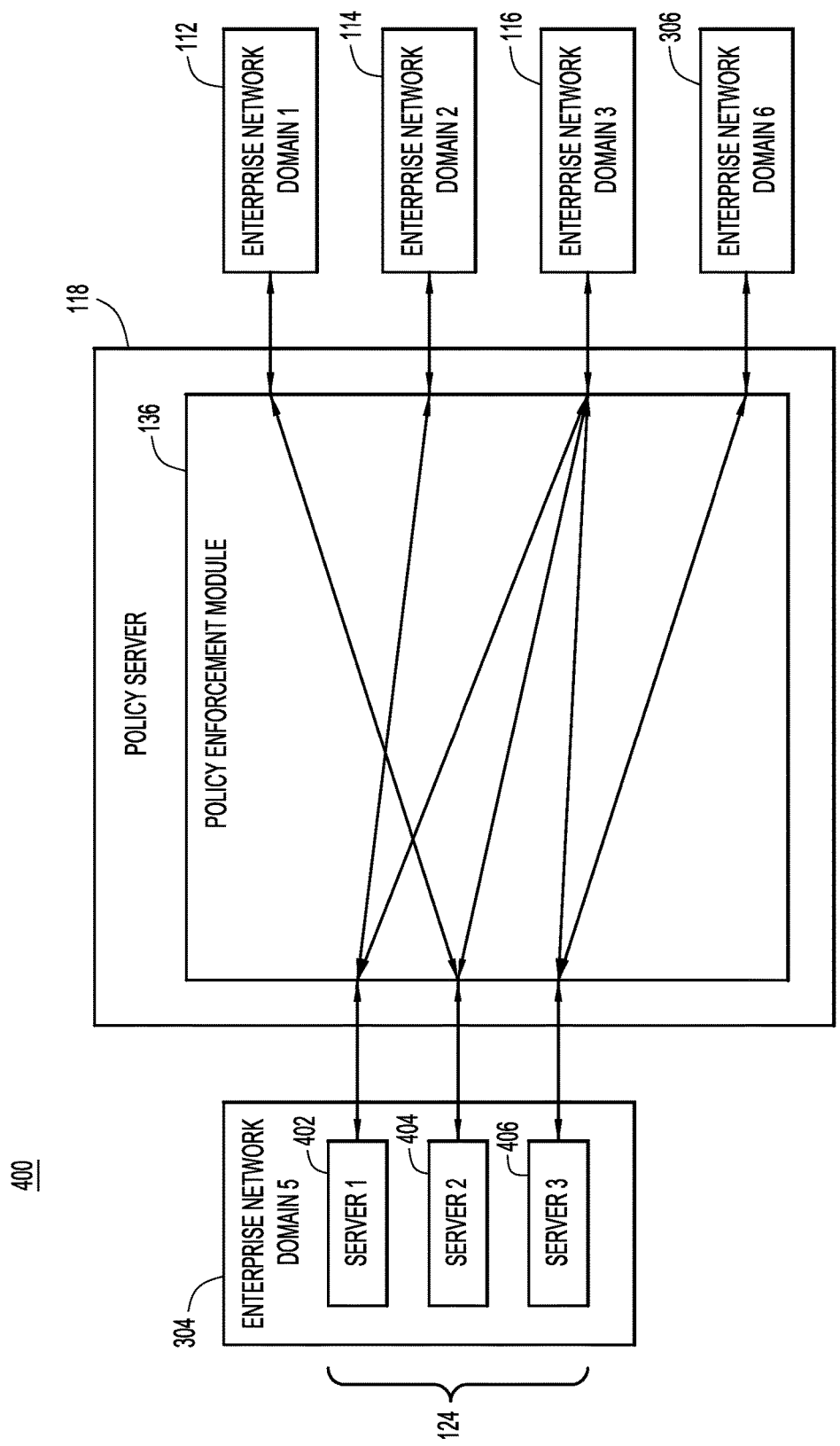
Figure 5:
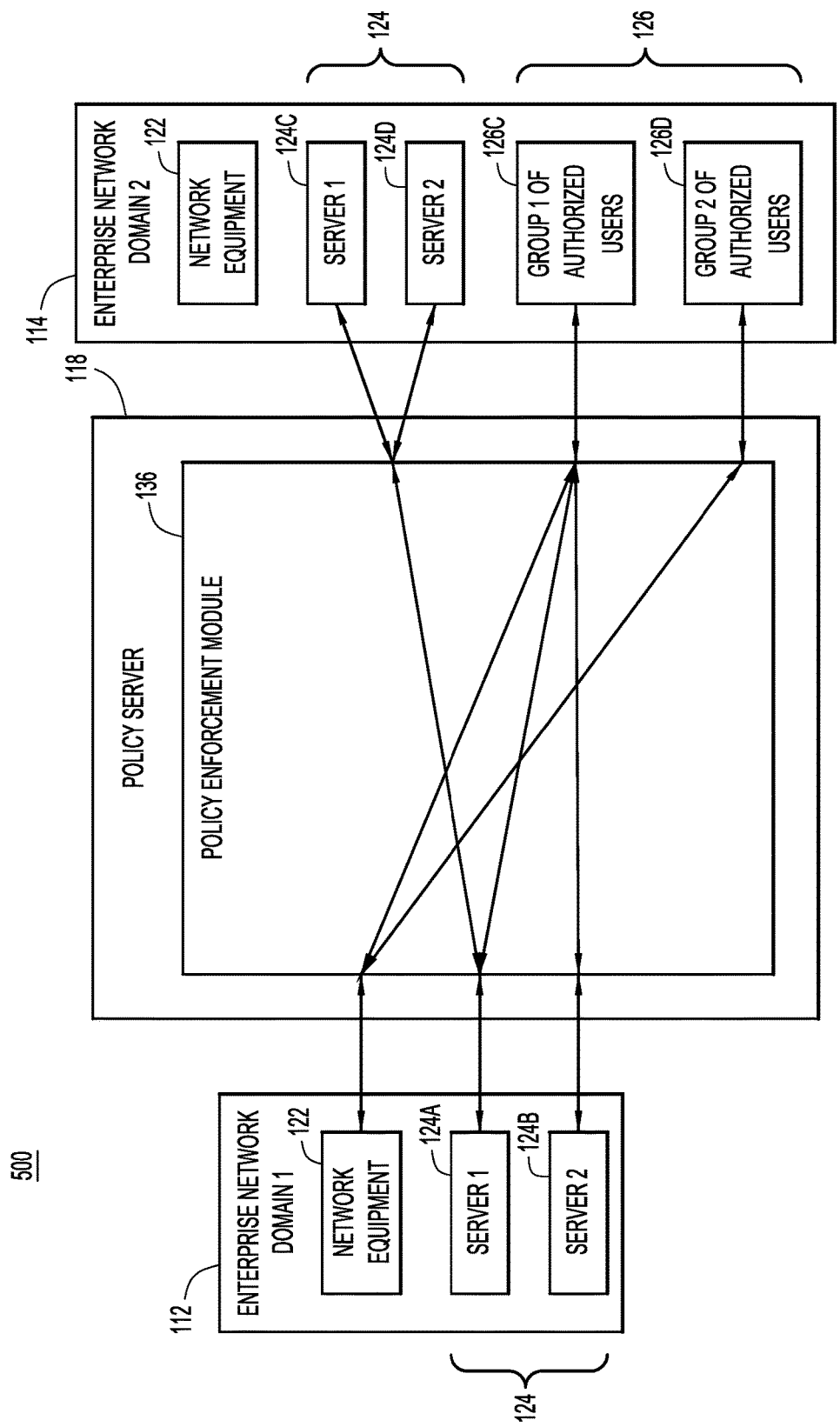

Now referring to FIGS. 4 and 5, in some embodiments, a federation relationship may include role-based policy enforcement such that different levels of access are enabled based on the one or more criterion provided by an enterprise network domain. Consequently, in some embodiments, an enterprise network domain (such as the fifth enterprise network domain 304) may have different levels of trust with its partners and, thus, a federation relationship established with different partners may enable certain enterprise network domains to access different portions of the first enterprise network domain 112, as illustrated in FIG. 4. Additionally or alternatively, the federation relationship may only enable specific entities in an enterprise network domain to access specific portions of the first enterprise network domain 112, as is illustrated in FIG. 5. Each of these scenarios is described in more detail below; however, the ecosystems illustrated in FIGS. 4 and 5 are merely examples and, in other embodiments, the policy enforcement module 136 may enable access in any manner. Reference is also made to FIGS. 1 and 3 for purposes of the description of FIGS. 4 and 5.

In the ecosystem 400 depicted in FIG. 4, the fifth enterprise network domain 304 has role-based policies for its servers 124 on an enterprise level and, thus, when the policy server 118 forms a federation relationship between the fifth enterprise network domain 304 and a partner enterprise network domain, the entirety of the partner enterprise network is enabled to access the same portion of the fifth enterprise network domain 304 (even though the fifth enterprise network domain 304 may not have access to the entirety of its partner's enterprise network domain, since this access may controlled by criteria supplied to the policy server by the partner enterprise network domain). Consequently, if a partner enterprise network domain, such as the third enterprise network domain 116, is enabled to access all of the servers 124 in the fifth enterprise network domain 304, any entities (i.e., the sales team, management team, research and development team, servers, etc.) included in that partner enterprise network domain can access all of the servers 124 included in the fifth enterprise network domain 304. By comparison, in the depicted embodiment, entities included in the first enterprise network domain 112 can only access a second server 404, entities included in the second enterprise network domain 114 can only access a first server 402, and entities included in the sixth enterprise network domain 306 can only access a third server 406. Among other advantages, enterprise level granularity may be desirable when working with smaller vendors or vendors with a specific task, since the entirety of these partner enterprises may need access to the same portion of the fifth enterprise network domain's resources in order to complete their task, project, job, etc.

By comparison, in the ecosystem 500 depicted in FIG. 5, the first enterprise network domain 112 and second enterprise network domain 114 have established rules on an entity level. Consequently, a first group of authorized users 126C (i.e., administrators) from the second enterprise network domain 112 may have full access to any infrastructure (i.e., network equipment 122 and servers 124) in the first enterprise network domain 112 while a second group of authorized users 126D (i.e., a sales team) from the second enterprise network domain 114 may only be enabled to access the Internet (via network equipment 122) when roaming in the first enterprise network domain 112. The same level of access may also be applied to servers and other such infrastructure. For example, the second enterprise network domain 114 may include a first server 124C and a second server 124D while the first enterprise network domain 112 may include a first server 124A and a second server 124B. Based on the rules or policies provided to the policy server 118 by the first enterprise network domain 112 and the second enterprise network domain 114, different servers may be enabled to access each other. In ecosystem 500, the first server 124A from the first enterprise network 112 is enabled to access the first server 124C and the second server 124D from the second enterprise network domain 114 and each of the servers 124C, 124D from the second enterprise network domain 114 can access the first server 124A, but not the second server 124B, from the first enterprise network domain 112. As an example, entity level granularity may be preferred when larger enterprises are working together on multiple projects and a first team of users needs access to a first set of resources while a second team of users needs access to a different, second set of resources.

Figure 6:
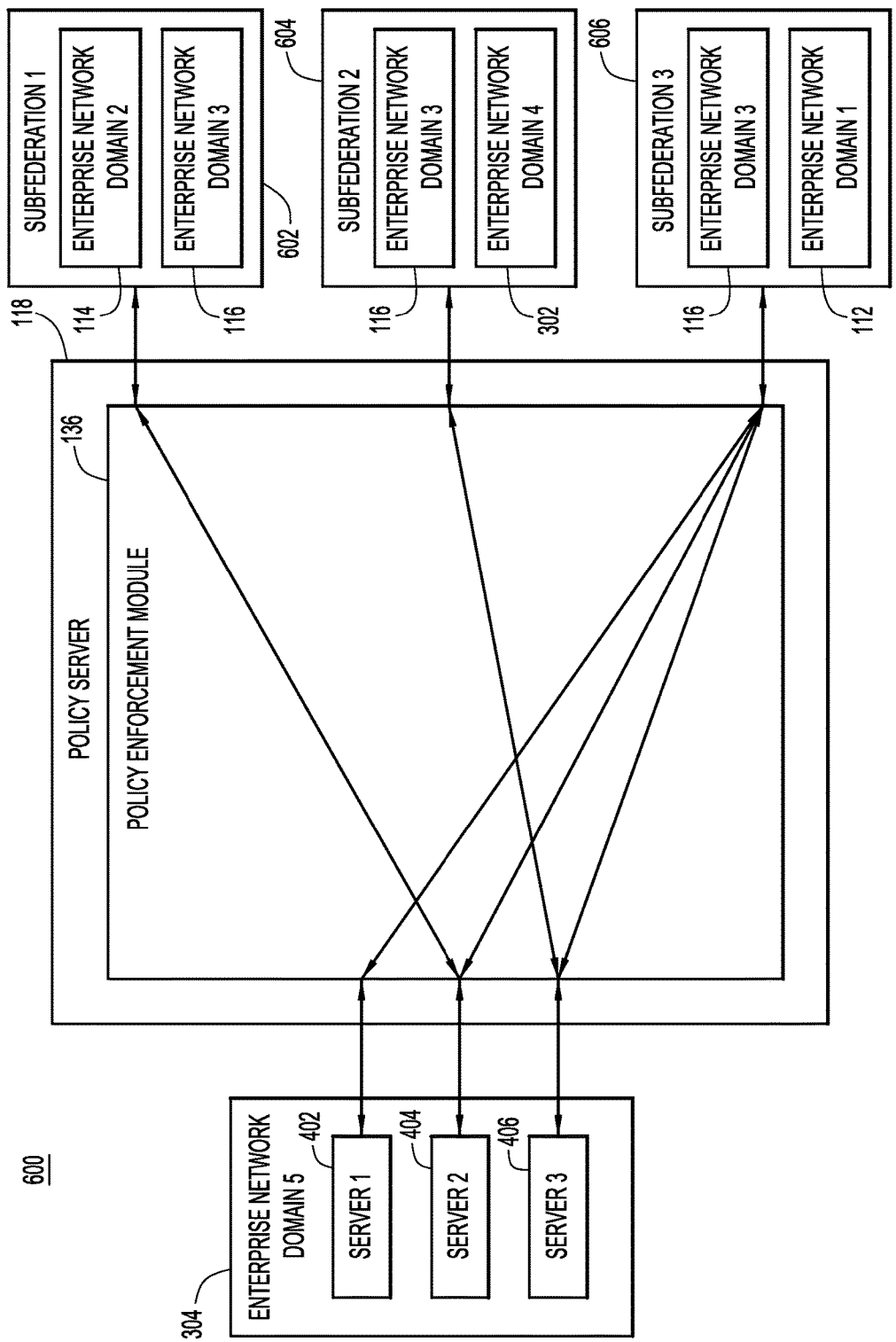

Now referring to FIG. 6, another example partner ecosystem 600 includes sub-federations. Reference is also made to FIGS. 1, 3, and 4 for purposes of the description of FIG. 6. Generally, as policy-driven trust relationships are built, an ecosystem of sub-federations can be established based on the level of trust an enterprise has with the other enterprise (perhaps a partner or a supplier) by grouping together enterprises or entities with the same level of trust. In other words, the federation relationships shown in FIGS. 3-5 can be aggregated into labeled groups, referred to herein as sub-federations. Then, the policy server 118 may enable different levels of access within an enterprise network domain for the different sub-federations based on the one or more criterion supplied by that enterprise network domain, perhaps enabling partners in a first sub-federation to have full access to that enterprise network domain, while partners in a second sub-federation only are enabled to access a specific portion of that enterprise network domain, such as the guest network.

As a more concrete example, if the second enterprise network domain 114 and the third enterprise network domain 116 are both suppliers to the fifth enterprise network domain 304, the enterprise network domains 114 and 116 can be grouped into a first sub-federation 602 and enabled to have the same access within the fifth enterprise network domain 304 (i.e., access to the first server 402). Similarly, if the third enterprise network domain 116 is also a lab partner and IT provider for the fifth enterprise network domain 304, the third enterprise network domain 116 may be grouped into a second federation 604 for lab partners with the fourth enterprise network domain 302 and a third sub-federation 606 for IT providers with the first enterprise network domain 112. The third enterprise network domain 116 may be provided with access to servers 124 within the fifth enterprise network domain 304 based on each of these groupings. In particular, the policy server 118 may enable the second sub-federation 604 to have access to the second server 404 in the fifth enterprise network domain 304 and may enable the third sub-federation 606 to have access to the third server 406 in the fifth enterprise network domain 304, such that the third enterprise network domain 116 is enabled to access each of server 402, server 404, and server 406.

Once sub-federations are established, a policy can be expressed in terms of labels instead of users, organizations, or some other entity. For example, a sub-federation called "suppliers" could be constructed by the first enterprise network domain 112 and could carry its own set of policy rules. Then, as the first enterprise establishes business relationships with different suppliers, the suppliers can be added to the suppliers sub-federation and the policy server 118 can automatically apply a set group of policies to the new suppliers based on their inclusion in the sub-federation. In other words, the federations may be recursive, insofar as the federations may update or repeat.

As an example, in some embodiments, the first enterprise network domain 112 could establish that any enterprise network domains that are classified (by the first enterprise network domain 112) as suppliers should have access to a first server, but not to a second server, included in the servers 124 of the first enterprise network domain 112, while enterprise network domains that are classified as lab partners should have access to the second server included in the servers 124 of the first enterprise network domain 112. In these embodiments, the labeled groups are maintained (i.e., created, monitored, updated, etc.) by an administrator from the first enterprise network domain 112. However, in other embodiments, the sub-federation grouping could be maintained by the policy server 118, perhaps based on metadata or maintained by another entity (like a trade group, a government etc.). For example, the first enterprise network domain 112 may provide access to its network equipment to any users from enterprises network domains that belong to a certain roaming consortium. In these instances, the administrator of the first enterprise network domain 112 only needs to set a policy for a particular group, without having to consider or determine membership.

Although not shown, the techniques presented herein may be used for an identity service for traditional IT enterprises as well as for Internet of Things (IoT) environments and more generally IoE environments. In order to extrapolate the techniques presented herein to the full reach of IoE, a public key infrastructure (PKI) may be utilized in order to scale the techniques presented herein to an IoE environment. The PKI infrastructure, while not mandatory, may enable "things" in an IoE or IoT environment to belong to a domain, so that the "things" may have a certificate representing a domain as part of its identity and a trust relationship can be established with the policy server 118 for the "things."

There are several advantages to the techniques presented herein. As an example, centralizing the identity establishment/enrollment at a policy server may serve to reduce the number of peering policies that an enterprise management by a magnitude of 100 or more (i.e., if the enterprise has 100 or more partners) since, as mentioned, centralizing the authentication changes the total number of policies from a N*M problem to an N+M problem (where N is the number of partners and M is the number of policies). Moreover, techniques presented may remove the need to maintain (and subsequently delete) specific accounts for guest users in an enterprise system and/or the need add guest users to an enterprise's identity system (which duplicates a portion of the user's home enterprise identity system). Instead, an enterprise can determine policies to apply to a wide variety of roles and the centralized policy server can apply the policies accordingly, thereby removing a large burden from an enterprise administrator. Techniques provided herein may also limit the risk traditionally associated with opening access to an identity server (i.e., a RADIUS-server) for a large number of machines.

In addition, compared to conventional techniques used by roaming consortia, which only determine if a user is "in or out of the club" before enabling access, techniques presented herein allow fine-grained control over business relations between any two peers by allowing trust relationships to be established at any level of granularity. Furthermore, techniques provided herein are simple to use and easily scalable at least because the policy server can generate sub-federations, recursive federations, and federations based on metadata, among other aspects. The techniques presented herein can also be easily extended in an IoT/IoE world to determine the trust between two devices (or entities) and the data exchange can be limited through policy enforcement. More generally, techniques presented herein solve a problem unique to enterprise computing environments by providing technology that can leverage a centralized trust to establish cross-domain relationships and control access to enterprise resources.

To summarize, in one form, a method is provided comprising: at a policy server having connectivity to a network, establishing a trust relationship with a first enterprise network domain and a second enterprise network domain; receiving one or more criterion from a server in the first enterprise network domain; establishing a federation relationship between at least a portion of the first enterprise network domain and one or more entities in the second enterprise network domain based on the one or more criterion; and enabling the one or more entities in the second enterprise network domain to access the at least a portion of the first enterprise network domain based on the federation relationship.

In another form, a system is provided comprising: a first enterprise network domain having connectivity to a network; a second enterprise network domain having connectivity to the network; a policy server having connectivity to the first enterprise network and the second enterprise network via the network, the policy server being configured to: establish a trust relationship with the first enterprise network domain and the second enterprise network domain; receive one or more criterion from a server in the first enterprise network domain; establish a federation relationship between at least a portion of the first enterprise network domain and one or more entities in the second enterprise network domain based on the one or more criterion; and enable the one or more entities in the second enterprise network domain to access the at least a portion of the first enterprise network domain based on the federation relationship.

In yet another form, a non-transitory computer-readable storage media encoded with software is provided comprising computer executable instructions and when the software is executed operable to: establish a trust relationship with a first enterprise network domain and a second enterprise network domain; receive one or more criterion from a server in the first enterprise network domain; establish a federation relationship between at least a portion of the first enterprise network domain and one or more entities in the second enterprise network domain based on the one or more criterion; and enable the one or more entities in the second enterprise network domain to access the at least a portion of the first enterprise network domain based on the federation relationship.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a policy server having connectivity to a network, establishing trust relationships with a plurality of enterprise network domains;
   receiving one or more first criteria from a first server in a first enterprise network domain of the plurality of enterprise network domains;
   receiving one or more second criteria from a second server in a second enterprise network domain of the plurality of enterprise network domains;
   establishing a first federation relationship between at least a portion of the first enterprise network domain and one or more entities in a third enterprise network domain of the plurality of enterprise network domains based on the one or more first criteria;
   establishing a second federation relationship between at least a portion of the second enterprise network domain and one or more entities in a fourth network domain of the plurality of enterprise network domains based on the one or more second criteria;
   providing the one or more entities in the third enterprise network domain with access to the at least a portion of the first enterprise network domain based on the first federation relationship; and
   providing the one or more entities in the fourth enterprise network domain with access to the at least a portion of the second enterprise network domain based on the second federation relationship.

2. The method of claim 1, wherein establishing the trust relationships comprises:
   receiving metadata from a server of a particular enterprise network domain of the plurality of enterprise network domains during an exchange of metadata with the server of the particular enterprise network domain; and
   authenticating the server of the particular enterprise network domain based on the metadata received in the exchange.

3. The method of claim 1, wherein the first server and the second server are each Remote Authentication Dial-In User Service (RADIUS) servers.

4. The method of claim 1, wherein the one or more first criteria comprises:
   one or more rules that define a permitted group such that the first federation relationship is established between the at least a portion of the first enterprise network domain and any of the one or more entities in the third enterprise network domain belonging to the permitted group.

5. The method of claim 1, further comprising:
   establishing a sub-federation group based on the one or more first criteria, wherein any of the one or more entities in the third enterprise network domain included in the sub-federation group is enabled to access a same portion of the first enterprise network domain.

6. The method of claim 1, wherein providing the one or more entities in the third enterprise network domain with access to the at least a portion of the first enterprise network domain further comprises:
   enabling an exchange between the first server and a third server included in the third enterprise network domain.

7. The method of claim 1, wherein the trust relationships are established with a public key infrastructure (PKI).

8. A system comprising:
   a first enterprise network domain having connectivity to a network;
   a second enterprise network domain having connectivity to the network;
   a third enterprise network domain having connectivity to the network;
   a fourth enterprise network domain having connectivity to the network;
   a policy server having connectivity to the first enterprise network domain, to the second enterprise network, to the third enterprise network domain, and to the fourth enterprise network domain via the network, the policy server being configured to:
   establish trust relationships with the first enterprise network domain, the second enterprise network domain, the third enterprise network domain, and the fourth enterprise network domain;

receive one or more first criteria from a first server in the first enterprise network domain;

receive one or more second criteria from a second server in the second enterprise network domain;

establish a first federation relationship between at least a portion of the first enterprise network domain and one or more entities in the third enterprise network domain based on the one or more first criteria;

establish a second federation relationship between at least a portion of the second enterprise network domain and one or more entities in the fourth enterprise network domain based on the one or more second criteria;

provide the one or more entities in the third enterprise network domain with access to the at least a portion of the first enterprise network domain based on the first federation relationship; and provide the one or more entities in the fourth enterprise network domain with access to the at least a portion of the second enterprise network domain based on the second federation relationship.

9. The system of claim 8, wherein in establishing the trust relationship with the first enterprise network domain, the policy server is further configured to:

receive metadata from the first server during an exchange of metadata with the first server; and authenticate the first server based on the metadata received in the exchange.

10. The system of claim 8, wherein the first server and the second server are each Remote Authentication Dial-In User Service (RADIUS) servers.

11. The system of claim 8, wherein the one or more first criteria comprises:

one or more rules that define a permitted group such that the first federation relationship is established between the at least a portion of the first enterprise network domain and any of the one or more entities in the third enterprise network domain belonging to the permitted group.

12. The system of claim 8, wherein the policy server is further configured to:

establish a sub-federation group based on the one or more first criteria, wherein any of the one or more entities in the third enterprise network domain included in the sub-federation group is enabled to access a same portion of the first enterprise network domain.

13. The system of claim 8, wherein in providing the one or more entities in the third enterprise network domain with access to the at least a portion of the first enterprise network domain, the policy server is further configured to:

enable an exchange between the first server and a third server included in the third enterprise network domain.

14. The system of claim 8, wherein the trust relationships are established with a public key infrastructure (PKI).

15. A non-transitory computer-readable storage media encoded with software comprising computer executable instructions and when the software is executed operable to:

establish trust relationships with a first enterprise network domain, a second enterprise network domain, a third enterprise network domain, and a fourth enterprise network domain;

receive one or more first criteria from a first server in the first enterprise network domain;

receive one or more second criteria from a second server in the second enterprise network domain;

establish a first federation relationship between at least a portion of the first enterprise network domain and one or more entities in the third enterprise network domain based on the one or more first criteria;

establish a second federation relationship between at least a portion of the second enterprise network domain and one or more entities in the fourth enterprise network domain based on the one or more second criteria;

provide the one or more entities in the third enterprise network domain with access to the at least a portion of the first enterprise network domain based on the first federation relationship; and provide the one or more entities in the fourth enterprise network domain with access to the at least a portion of the second enterprise network domain based on the second federation relationship.

16. The non-transitory computer-readable storage media of claim 15, wherein in the establishing the trust relationship with the first enterprise network domain, the software is further operable to:

receive metadata from the first server during an exchange of metadata with the first server; and authenticate the first server based on the metadata received in the exchange.

17. The non-transitory computer-readable storage media of claim 15, wherein the first server and the second server are each Remote Authentication Dial-In User Service (RADIUS) servers.

18. The non-transitory computer-readable storage media of claim 15, wherein the one or more first criteria comprises:

one or more rules that define a permitted group such that the first federation relationship is established between the at least a portion of the first enterprise network domain and any of the one or more entities in the third enterprise network domain belonging to the permitted group.

19. The non-transitory computer-readable storage media of claim 15, wherein the software is further operable to:

establish a sub-federation group based on the one or more first criteria, wherein any of the one or more entities in the third enterprise network domain included in the sub-federation group is enabled to access a same portion of the first enterprise network domain.

20. The non-transitory computer-readable storage media of claim 15, wherein in providing the one or more entities in the third enterprise network domain with access to the at least a portion of the first enterprise network domain, the software is further operable to:

enable an exchange between the first server and a third server included in the third enterprise network domain.

* * * * *